United States Patent
Blaicher

(10) Patent No.: US 7,496,572 B2
(45) Date of Patent: Feb. 24, 2009

(54) REORGANIZING DATABASE OBJECTS USING VARIABLE LENGTH KEYS

(75) Inventor: Christopher Y. Blaicher, Austin, TX (US)

(73) Assignee: BMC Software, Inc., Houston, TX (US)

(*) Notice: Subject to any disclaimer, the term of this patent is extended or adjusted under 35 U.S.C. 154(b) by 1198 days.

(21) Appl. No.: 10/618,500

(22) Filed: Jul. 11, 2003

(65) Prior Publication Data

US 2005/0010590 A1 Jan. 13, 2005

(51) Int. Cl.
*G06F 7/00* (2006.01)
*G06F 17/30* (2006.01)

(52) U.S. Cl. .................. 707/7; 707/102; 707/101
(58) Field of Classification Search .............. 707/7, 707/101, 102
See application file for complete search history.

(56) References Cited

U.S. PATENT DOCUMENTS

| 4,611,280 A | * | 9/1986 | Linderman | 712/300 |
| 5,247,665 A | * | 9/1993 | Matsuda et al. | 707/101 |
| 5,274,805 A | * | 12/1993 | Ferguson et al. | 707/7 |
| 6,181,678 B1 | * | 1/2001 | Ha-Duong et al. | 370/235 |

* cited by examiner

*Primary Examiner*—Hosain T Alam
*Assistant Examiner*—Usmaan Saeed
(74) *Attorney, Agent, or Firm*—Wong, Cabello, Lutsch, Rutherford & Brucculeri, L.L.P.

(57) ABSTRACT

Techniques for sorting data include (1) obtaining records containing variable length key fields, (2) expanding the variable length key fields into fixed length key fields in a temporary structure, (3) sorting the temporary structure based on the fixed length key fields, and (4) reorganizing the data containing the variable length key fields in accordance with the sorted temporary structure. Reorganized data can replace the original data or be saved to temporary storage where it can later be merged with other reorganized data. Temporary storage of reorganized data does not incorporate the expanded fixed length key information used in the temporary structure.

63 Claims, 6 Drawing Sheets

REORGANIZING DATABASE OBJECTS USING VARIABLE LENGTH KEYS

BACKGROUND

The present invention relates to sorting techniques and more particularly, but not by way of limitation, to a system and methods for sorting data having variable length sort key fields.

The process of sorting an object generally involves (1) reading the object from external storage, often referred to as "unloading" the object, (2) passing the object's data to a utility that reorders/sorts the data in accordance with a specified sort key and (3) writing the sorted data back to the object's file on external storage, often referred to "reloading" the object. It will further be understood that all sort routines compare items of the same size. That is, the size of an object's sort key must be constant from record to record during the sort operation. As used herein, the term 'object' refers to any collection of data that may be sorted. For example, an array or list of elements, one or more tables in a relational database or a collection of records within a conventional file structure. One of ordinary skill in the art will understand that an object typically includes one or more records, that records are comprised of one or more fields, that one or more fields are designated as a sort key and that sorting reorders an object's records based on the value of the records' sort keys.

One prior art technique for sorting objects having variable length keys is shown in FIG. 1. Sort routine 100 reads and pads a record from the object being sorted (block 105). The act of padding converts variable length key fields to fixed length key fields of a size great enough to accommodate any value that the key may assume. Once padded, the record is written to an intermediate file (block 110). If there are additional records to pad (the 'NO' prong of block 115), processing continues at block 105. If the object has been completely unloaded (the 'YES' prong of block 115), a sort utility is invoked that reorders and then stores the padded records in a result file (block 120). Each sorted and padded record is then retrieved from the result file, unpadded and reloaded into the object (blocks 125, 130 and 135). The act of unpadding adjusts the size of each record's sort key to its original size. Using pad and unpad processes can be very intensive to intermediate storage since a padded copy of the entire object (possibly an entire database) needs to be created. Given that many keys are a fraction of the size that must be supported; the padded copy of an object can be several times the size of the original. In addition, since a single object can not generally be retained in working memory, the time required to write and read an intermediate file having expanded sort keys can consume a significant portion of the total time needed to sort the object (e.g., the total elapsed time from block 105 to block 135).

To mitigate some of the aforementioned drawbacks, certain commercially available sort applications support input and output routine customization. These user-created, application specific, programs are commonly referred to as E15 (input) and E35 (output) programs. As illustrated in FIG. 2, after obtaining a record from (unsorted) object 200, E15 program 205 pads the record's sort key and passes the padded record to E15 interface 210. Sort routine 215 accepts input from E15 interface 210, sorts the records in accordance with the specified key and manages the transfer of padded data to and from intermediate storage 220. Following completion of the sort operation, sort routine 215 passes the sorted and padded records through E35 interface 225 to E35 program 230 which then unpads the records and reloads object 200.

One significant drawback to prior art sorting techniques is that for large objects (e.g., databases and/or large database objects) comprising tens of megabytes to tens of terabytes, the time required to transfer padded data to and from intermediate storage can comprise a significant portion of the total time required to unload, sort and reload the target object. In addition, the amount of intermediate storage needed to retain padded data can be a significant use of resources. Thus, it would be beneficial to provide techniques (methods and devices) to sort data that is more time and resource efficient than current techniques.

SUMMARY

In one embodiment, the invention provides a method to sort data. The method includes obtaining a plurality of data records and, for each data record: (1) extracting key information, (2) expanding the extracted key information, and (3) storing the expanded key information in a key record. The plurality of key records may then be sorted (based on the expanded key information), and used to reorganize the plurality of data records which may then be stored in working or intermediate storage while additional plurality of data records are similarly processed. Unlike prior art sorting techniques, methods in accordance with the invention do not store expanded key information to intermediate storage. Methods in accordance with the invention may be embodied in instructions stored in any media that is readable and executable by a computer system.

In another embodiment, the invention provides a sort control card that may be used to identify the location of key fields within a data record. Sort control cards in accordance with the invention may be particularly useful in those situations in which data records comprise two or more variable length fields (key or data fields). Sort control cards in accordance with the invention may also be particularly useful in those situations in which fixed length key fields are used, but where one or more variable length data fields precede one or more key fields.

DETAILED DESCRIPTION

The invention relates generally to sorting and, more particularly, to methods and devices for sorting data having variable length keys. Compared to the prior art, techniques in accordance with the invention can substantially reduce the amount of data moved between working memory and intermediate storage during a sort operation. This, in turn, can significantly reduce the start-to-finish time and the amount of intermediate storage needed by the sorting operation. As previously noted, as used herein the term 'object' refers to any collection of data that may be sorted and includes, without limitation, database objects, arrays, lists and collections of records within conventional file structures.

Figure 3:
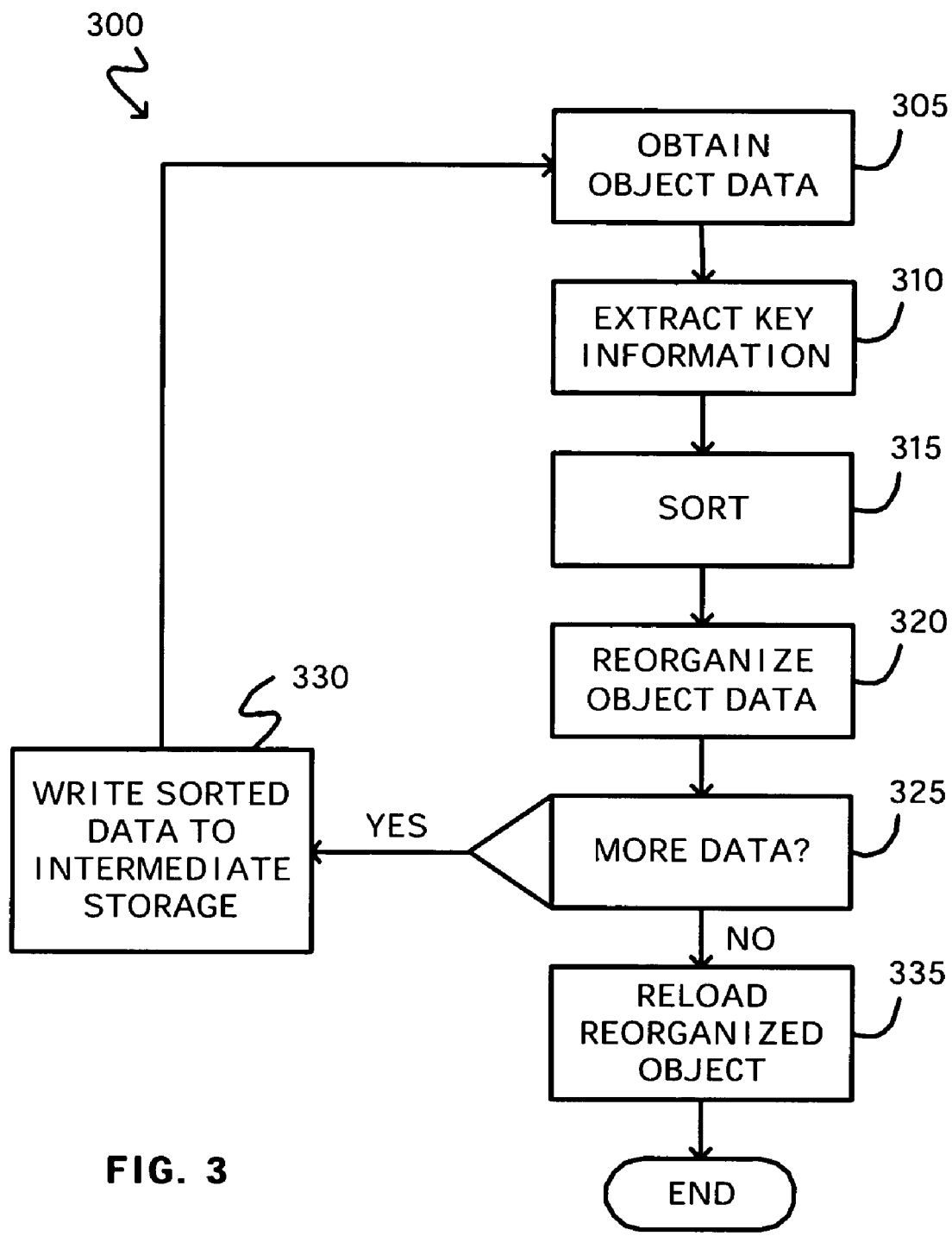
FIG. 3 shows, in flowchart form, a sorting technique in accordance with one embodiment of the invention.

FIG. 3 illustrates sorting process 300 in accordance with one embodiment of the invention. To begin, a first quantum of object data is retrieved, generally comprising a number of records (block 305). A quantum of data is typically that amount of data that can be retained and manipulated in working memory such as, for example, in a data-in buffer. Key extraction techniques are then used to identify the fields within a record that comprise the object's sort key and the maximum size of each of the fields; the relevant keys from each record obtained are then extracted, padded and placed into a key structure (block 310). Key structures in accordance with the invention generally include one record for each data record retrieved in accordance with block 305, wherein each key structure record further includes an indication of the data record from which the key was extracted. The key structure is then sorted to reorder the key structure records in accordance with the desired sort properties (block 315). For example, the key structure records may be reordered in ascending order based on the value of the padded key values. The sorted key structure is then used to reorder the data obtained during the acts of block 305 (block 320).

If the object being sorted has data that has not yet been processed (the 'YES' prong of block 325), the reorganized quantum of data is written to intermediate storage (block 330) and the next quantum of data is retrieved (block 305). The acts of block 310-320 are repeated for each quantum of object data. It is significant to note that the reorganized data written to intermediate storage in accordance with block 330 does not include padded key information. Accordingly, both the amount of data and the time required to store and retrieve this data is substantially less than that of prior art sorting techniques. If all of the object's data has been processed in accordance with blocks 305-320 (the 'NO' prong of block 325), the one or more quanta of sorted data are reloaded back into the database (block 335), thereby completing the object's reorganization. It will be recognized that if the data object being sorted comprises more than one quanta of data, the intermediate sorted quanta (written during the acts of block 330) must first be merged prior to, or in the process of, reloading the object in block 335.

Figure 4:
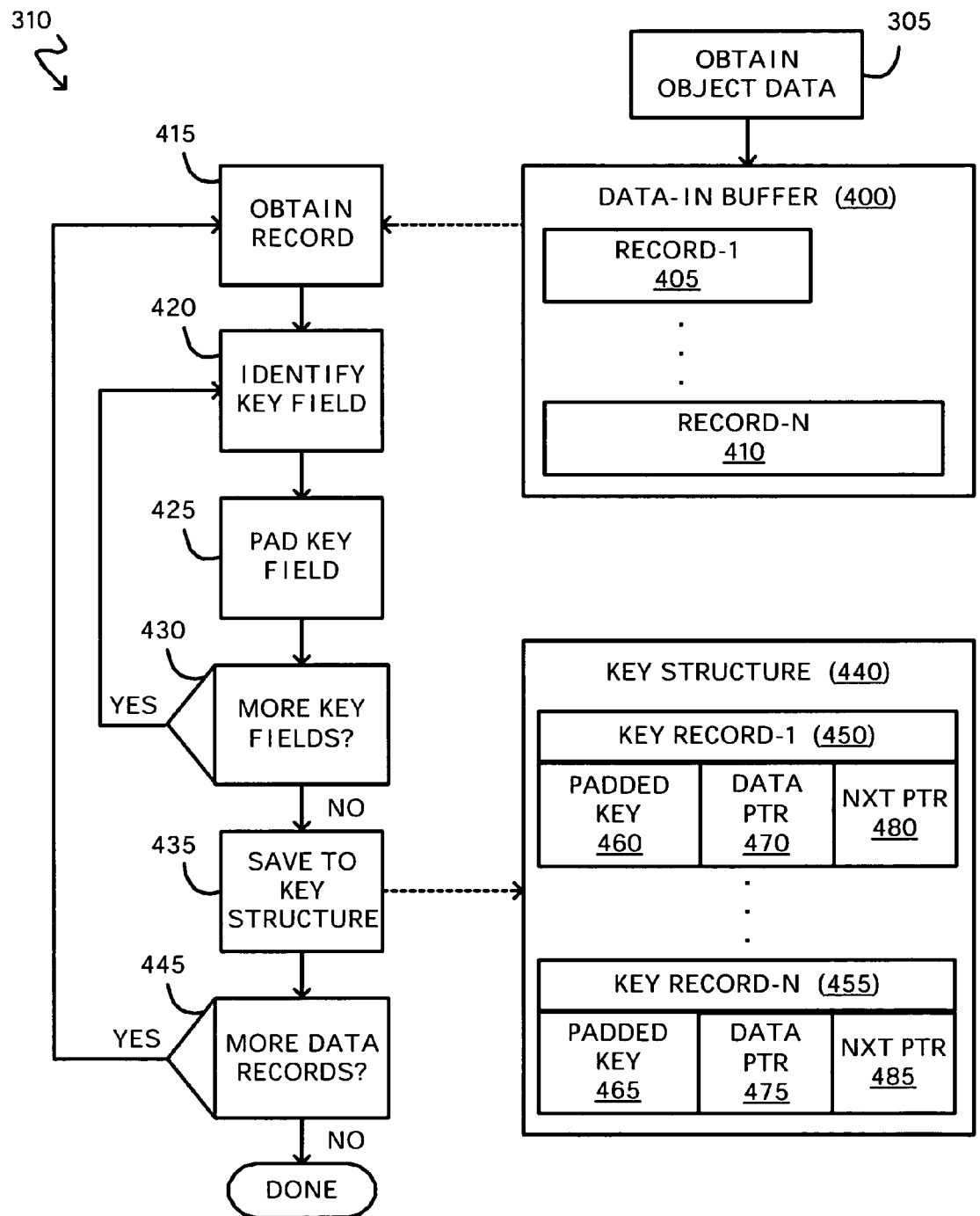
FIG. 4 shows, in flowchart form, a key extraction technique in accordance with one embodiment of the invention.

In one embodiment, the acts of block 310 (see FIG. 3) may be embodied as illustrated in FIG. 4. To begin, records from a data object obtained in accordance with block 305 of FIG. 3 are retrieved into a temporary working memory such as, for example, data-in buffer 400. As shown, data object records 405 and 410 may be different lengths. For each record retrieved from buffer 400 (block 415), a first field is identified as a key field (block 420). The identified field is then copied into a working memory and padded to its maximum length (block 425). If the record has additional key fields (the "YES" prong of block 430), the acts of blocks 420 and 425 are repeated. If the record has no additional key fields (the "NO" prong of block 430), the padded key fields are saved to key structure 440 (block 435). If the data object has additional records (the "YES" prong of block 445), the acts of block 415-435 are repeated. If the data object has no additional records (the "NO" prong of block 445), key extraction in accordance with the invention (e.g., block 300) is complete.

As shown, each data object record in buffer 400 (e.g., record-1 405 and record-N 410) has a corresponding record in key structure 440 (e.g., key record-1 450 and key record-N 455) wherein each key record comprises a padded key field (e.g., 460 and 465), a data pointer field (e.g., 470 and 475) and a next pointer field (e.g., 480 and 485). Padded key fields 460 and 465 represent the combined padded key fields for each record and, as such, are of fixed length. Data pointer fields 470 and 475 point back to that data record from which the key record's padded key field was extracted. That is, data pointer field 470 points to record-1 405 and data pointer field 475 points to record-N 410. Next pointer fields 480 and 485 point to the next record in key structure 440.

Referring now to FIGS. 3 and 4, a key structure populated in accordance with FIG. 4, may be sorted in accordance with block 315 (see FIG. 3). Once sorted, the key structure's data pointer fields may be used to reorganize the data records in buffer 400 in accordance with block 320 (see FIG. 3). As the next buffer of data object records are loaded into working memory (i.e., buffer 400), the newly reorganized buffer of records may be written to working or intermediate storage (see block 330 of FIG. 3). In another embodiment, the data records may be reorganized into a second (e.g., output) buffer which may then be sent to working or intermediate storage. It is significant to note that the data written to intermediate storage does not include padded key field information. Accordingly, the amount or volume of data written to working storage and the time required to write (and subsequently read) it can be significantly less than in prior art techniques, especially in the aggregate for large data objects.

Key identification and extraction in accordance with one embodiment of the invention uses sort control cards that identify where each key is within a data record (e.g., record-1 405 of FIG. 4), the maximum size of the key and the field's data type. (It is noted that prior art technology does not permit the creation of key structures from object data having variable length keys or keys that start at arbitrary locations within a record.) One illustrative example of a sort control card that characterizes a data object's fields in a manner that enables the identification of the object's sort fields is as follows:

SORT_FIELDS(S1, M1, T1, A1 ... Sn, Mn, Tn, An).

S1 represents the starting location in the record of the first key field and Sn represents the starting location of the nth field. If the nth field's starting location varies depending upon the actual length of prior fields (e.g., the first key field), Sn may be set to a value indicative of this such as, for example, an asterisk ('*'). M1 represents the maximum length of the first sort field and Mn represents the maximum length of the nth field. (One of ordinary skill in the art will recognize that the actual size of any given field in a record may be encoded in the field itself or in another known location within the record.) T1 represents the type and nature of the first sort field and Tn the type and nature of the nth field. Illustrative field types include, but are not limited to, floating point, integer, character, Boolean and ASCII types. In addition, the type of field may be augmented to indicate whether it is a fixed-length or variable-length field. For example, a fixed-length character field may be identified as FCH while a variable length character field may be identified as VCH. A1 and An indicate whether the first and nth fields (respectively) should be sorted in an ascending or descending order. As illustrated below, if a field is not a key field it may not have an associated sequence (ascending/descending) value. Using a sort control card such as that described above, the object to be sorted can be queried to obtain the object's key information so that the object's keys may be properly extracted and padded.

Figure 1:
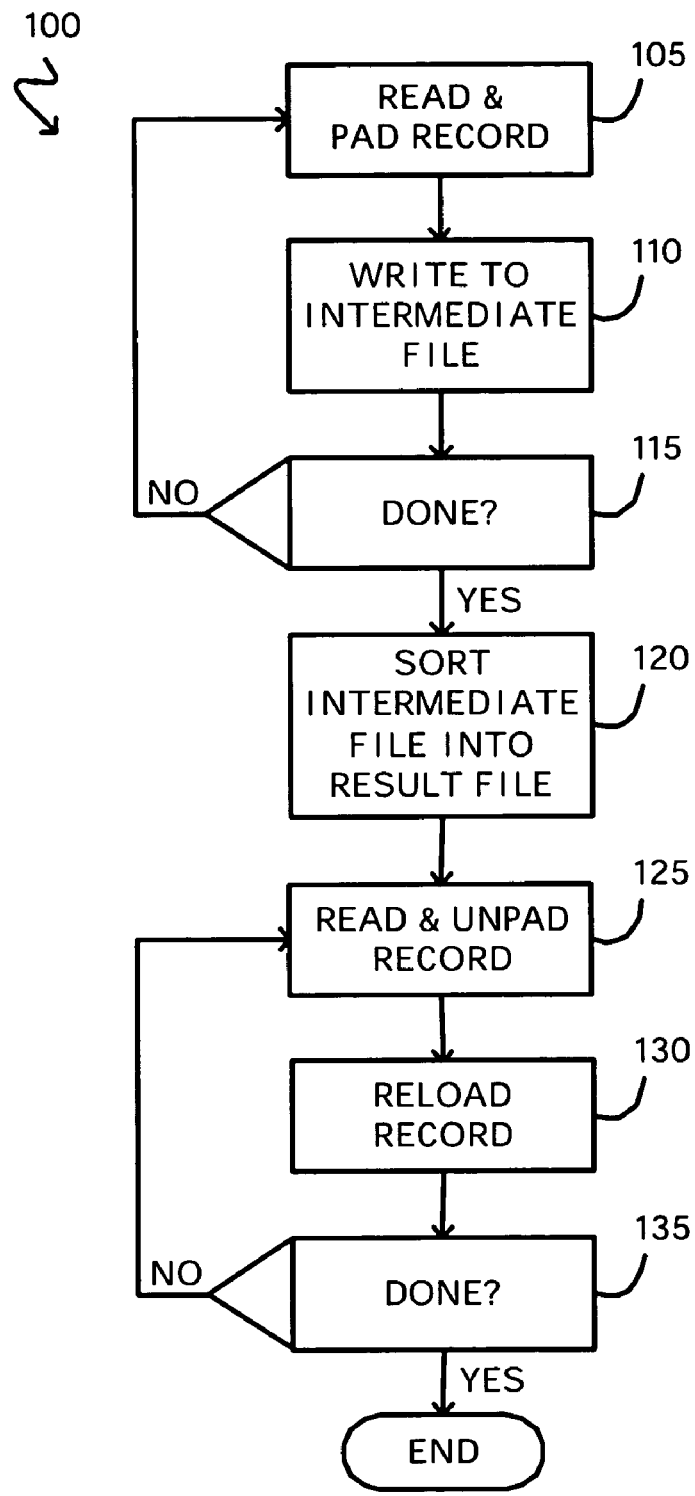
FIG. 1 shows one prior art method for sorting an object.
Figure 2:
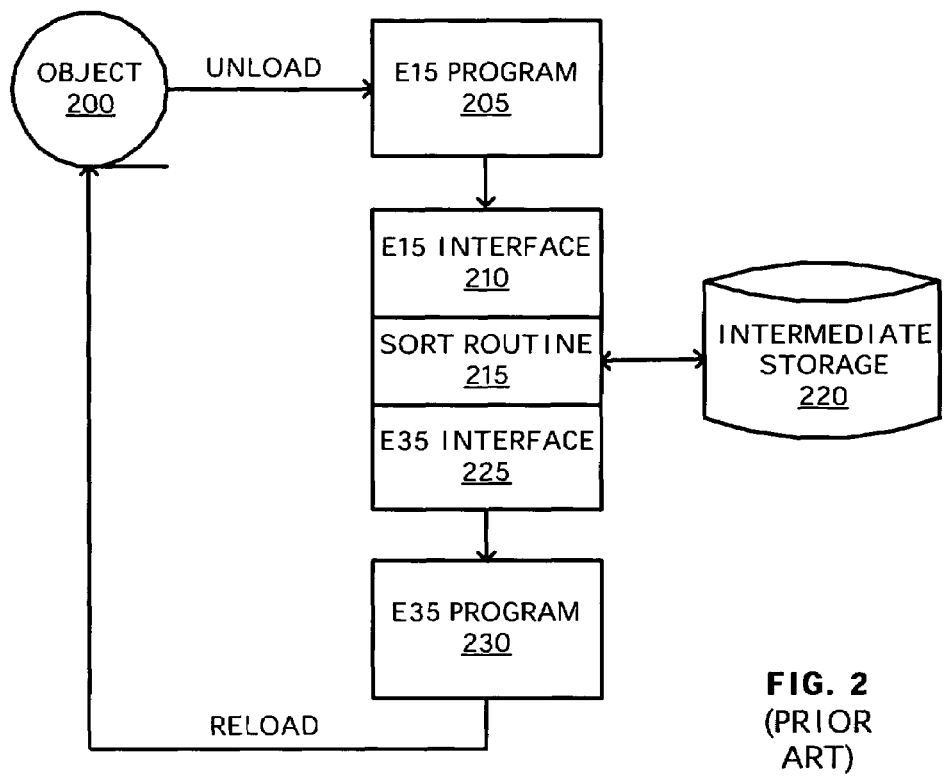
FIG. 2 shows another prior art method for sorting an object.
Figure 5:
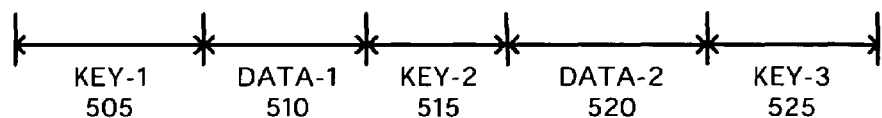
FIG. 5 shows an illustrative sort control card in accordance with one embodiment of the invention.

Referring to FIG. 5, illustrative sort control card 500 identifies five (5) fields in a data object's record. The first field, key-1 505, begins at a fixed position (27) in the record. (This implies there are no variable length fields before position 27.) The maximum length of field 505 is 35 bytes, it is a variable length character type (VCH) and should be sorted in ascending order (A). The second field, data-1 510, begins at a variable position within the record ('*'), is 10 bytes in length and is data (DATA)—that is, not a key. Because field 510 is not a key field, it does not require a sort-order indication attribute. It will be recognized by one of ordinary skill in the art that the precise starting location of data-1 field 510 may be calculated based on the known starting position of prior field 505 and the known actual size of filed 505, which is typically encoded as the first one or more bytes in field 505. (This same process may also be used to calculate the actual starting location for each subsequent filed—515, 520 and 525.) The third field, key-2 515, is another key field that begins at a variable position within the record ('*'), has a maximum length of 8 bytes, is a variable length long integer (VL) and should be sorted in ascending order (A). The fourth field, data-2 520, begins at a variable position within the record ('*'), has a maximum length of 255 bytes and is a variable length non-key field (VDATA). The fifth field, key-3 525, is yet another key field that begins at a variable position within the record ('*'), has a maximum length of 55 bytes, is a variable length binary field (VBI) and should be sorted in descending order (D).

It will be recognized that most practical data objects are so large that they cannot be sorted in a single pass. That is, a single data object may comprise sufficient information to fill many hundreds, thousands or millions of buffers (e.g., buffer 400 of FIG. 4). In these cases, those portions of the data object sorted and written to intermediate storage during the acts of block 330 of FIG. 3, must be merged before the object may be reloaded in accordance with block 335 of FIG. 3.

Figure 6:
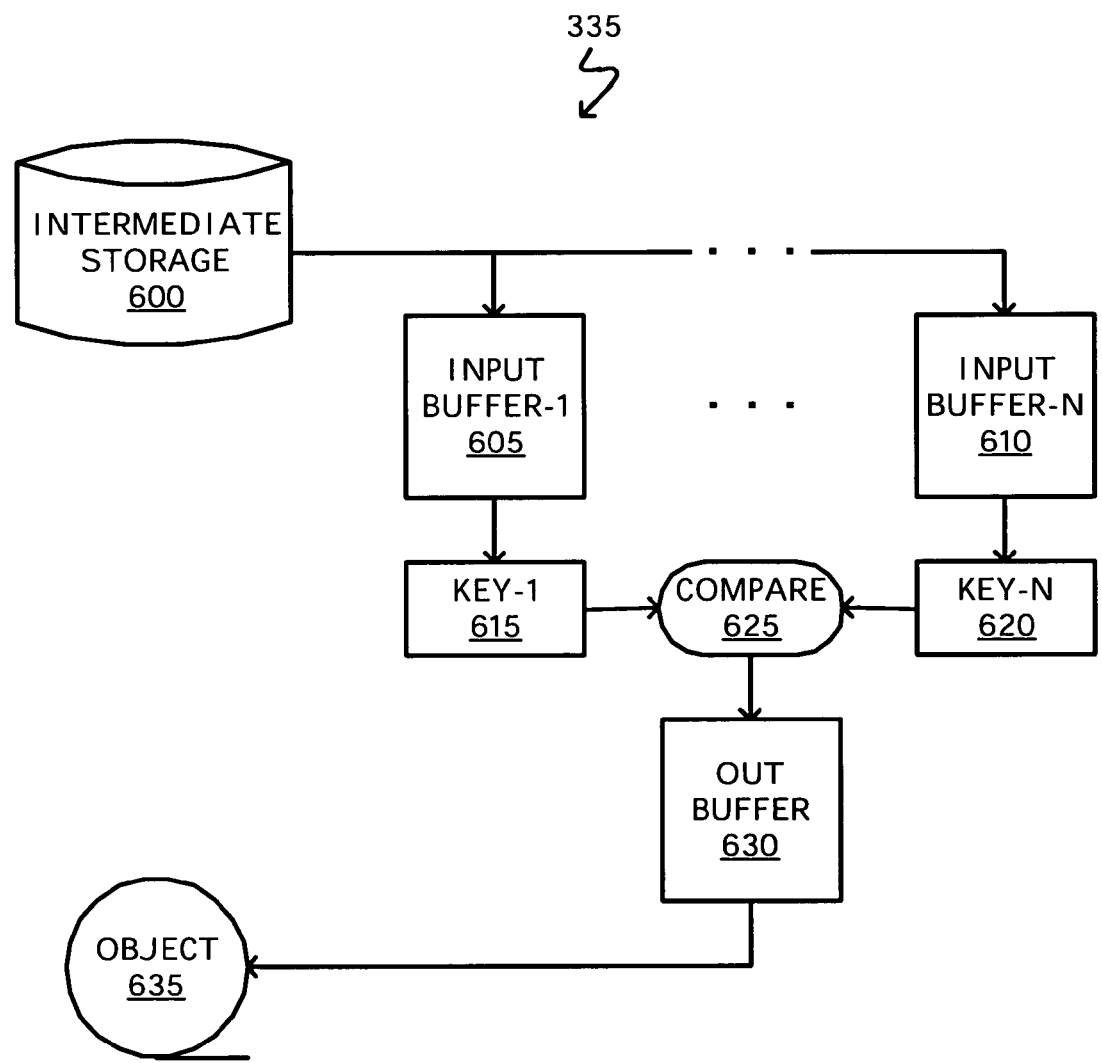
FIG. 6 shows, in block diagram form, a merge operation in accordance with one embodiment of the invention.

Referring now to FIG. 6, in one embodiment sorted data object information is retrieved from intermediate storage 600 and placed into two or more input buffers (e.g., 605 through 610). Because each input buffer of data 605 through 610 has already been sorted, its lowest (highest) key value is known. For example, the record having the lowest (highest) key value may be the first record in each buffer. To permit comparison, the designated key value (lowest or highest) is extracted (see, for example, the discussion above regarding FIGS. 3 and 4), padded and placed in a key register (e.g., 615 through 620). The keys are then evaluated by compare operator 625, with the record having the lowest (highest) key value being placed in output buffer 630. This operation is repeated until all records in buffer 605 through 610 are merged. One of ordinary skill in the art will recognize that the operations of FIG. 6 may be repeated a number of times and that, further, such operations may involve using intermediate storage. That is: a first plurality of data buffers may be merged into a first output buffer which is then written to intermediate storage; a second plurality of data buffers may then be merged into a second output buffer which is also written to intermediate storage . . . wherein the two or more intermediate output buffers are then merged in accordance with FIG. 6. Regardless, however, of the number of levels of comparison needed, the operations will proceed as outlined. In another embodiment, each key is expanded as it is brought in from intermediate storage 600 and placed in an input buffer. In this embodiment, the expanded key values are reduced to their original state prior to reloading object 635.

Figure 7:
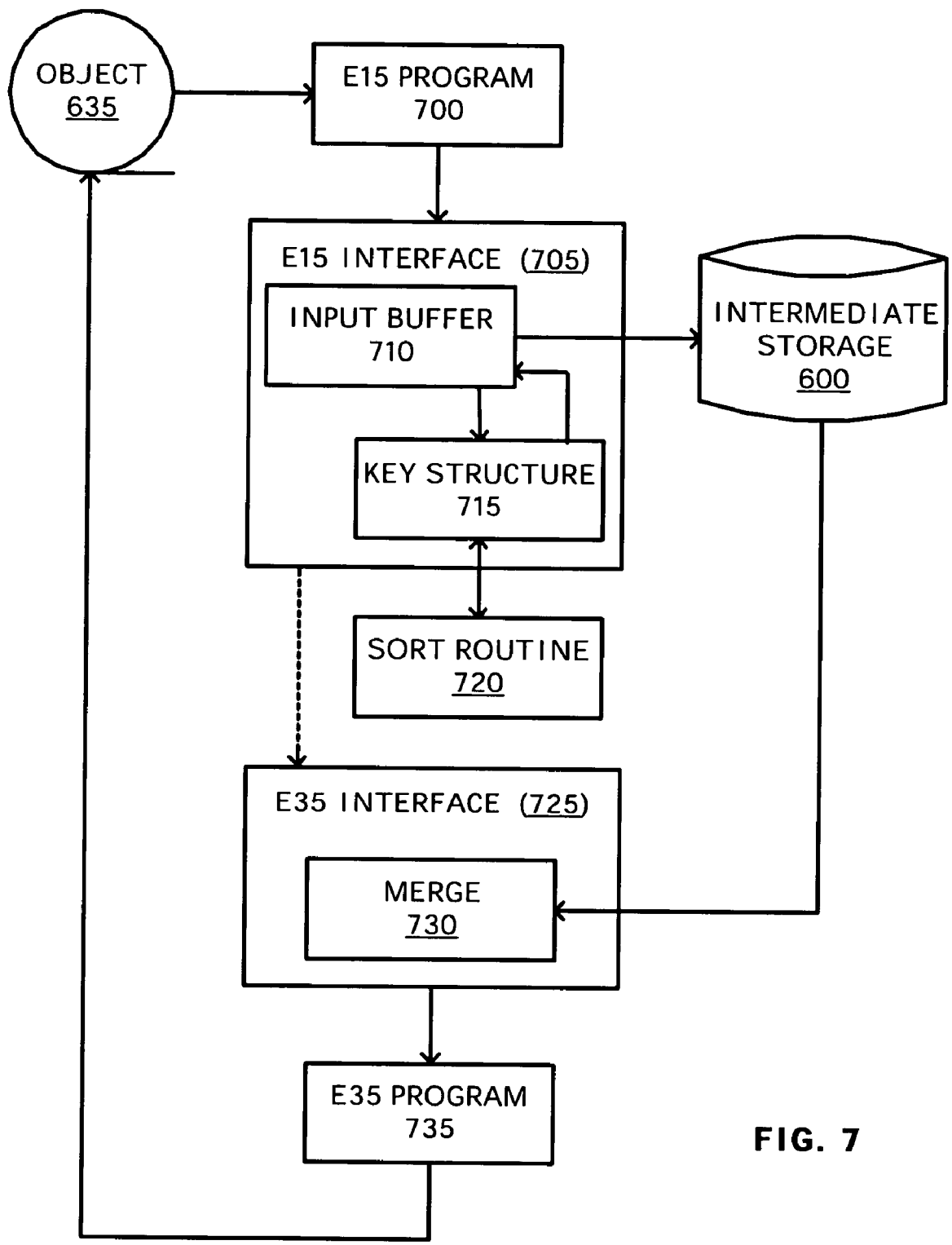
FIG. 7 shows, in block diagram form, a preferred embodiment of the invention.

A preferred embodiment in terms of a DB2® database can be seen in FIG. 7. (DB2 is a registered trademark of the International Business Machines Corporation of Armonk, N.Y.) Data is retrieved from object 635 one record at a time by E15 program 700. Each record is passed to E15 interface 705 which places them into buffer 710. E15 Interface 705 extracts and expands each record's key fields, storing the padded keys as fixed length components in a key record stored in key structure 715. When input buffer 710 and/or key structure 715 is full (or until all of object 635's records are obtained), key structure 715 is sorted by sort routine 720. Sorted key structure 715 is used to reorganize the records in buffer 710 (or, alternatively, into a separate output buffer) which is then stored on intermediate storage device(s) 600. After all of object 635's records have been processed, control is passed to E35 interface 725 which merges the sorted data stored on intermediate storage 600 (block 730). The merged data is passed to E25 program 735 which then reloads the data into object 635.

In another embodiment, key extraction, pad and sort techniques in accordance with the invention may be implemented within sort routine 720 itself. In this latter embodiment, E15 program 700 and/or E15 interface 705 may simply provide, without modification, data object records to sort routine is 720. In still another embodiment, E15/E35 programs and interfaces may not be used at all. In these embodiments, sort routine 720 obtains data object records directly from object 635.

While the invention has been disclosed with respect to a limited number of embodiments, numerous modifications and variations will be appreciated by those skilled in the art. For example, various changes in the details of the illustrated operational methods are possible without departing from the scope of the claims. By way of example, various key extraction and/or sort control card techniques may be employed to identify and expand key fields within a data record. In addition, one of ordinary skill in the art will recognize that data pointer fields 470 and 475 and next pointer fields 480 and 485 may be embodied in non-pointer fields. For example, key structure 440 may be implemented as an array such that next pointer fields 480 and 485 may be eliminated. Similarly, if data-in buffer 400 is implemented as an array, data pointer fields 470 and 475 in key structure 440 may retain the index value (typically an integer) of the associated data-in array index. It will further be recognized that data objects (e.g., 635) may be stored on one or more direct access storage devices and, also, that intermediate storage (e.g., 600) may comprise one or more such devices. It is further noted that sorting techniques in accordance with the invention are not limited to sorting database objects, but instead may be applied to sort any data and is especially helpful when processing/sorting large data objects. One of ordinary skill in the art will also recognize that the sorting and key extraction techniques described herein are equally applicable to data having variable length keys and/or to data having one or more variable length data fields located prior to a (fixed or variable length) key field. That is, in both instances prior art techniques do not provide a way to locate or identify key field starting locations and, further, do not limit the amount of intermediate storage used by storing only raw (unpadded) object data.

Acts in accordance with FIGS. 3 and 4 and the operations associated with FIG. 6 may be performed by a programmable control device executing instructions organized into a program module. A programmable control device may be a single computer processor, a plurality of computer processors coupled by a communications link, or a custom designed state machine embodied in a hardware device such as a printed circuit board comprising discrete logic, integrated circuits, or specially designed application specific integrated circuits (ASICs). Storage devices suitable for tangibly embodying program instructions include, but are not limited to: magnetic disks (fixed, floppy, and removable) and tape; optical media such as CD-ROM disks; and semiconductor memory devices such as Electrically Programmable Read-Only Memory (EPROM), Electrically Erasable Programmable Read-Only Memory (EEPROM), Programmable Gate Arrays and flash devices.

What is claimed is:

1. A data sort method, comprising:
obtaining a plurality of data records and, for each data record
extracting key information,
expanding the extracted key information, and
storing the expanded key information in a key record, wherein the expanded key information is not stored in the intermediate storage;
sorting the plurality of key records based on the expanded key information;
reorganizing the plurality of data records to correspond to the order of the sorted plurality of key records; and
storing the reorganized plurality of data records without their associated expanded key information to a working storage.

2. The method of claim 1, wherein the act of obtaining comprises obtaining data records from one or more storage devices.

3. The method of claim 1, wherein the act of extracting comprises:
determining a starting location for a first key field; and
calculating the starting location of a subsequent key field based on the determined starting location of the first key field.

4. The method of claim 3, wherein the act of determining comprises obtaining the starting location of the first key field from a sort control card.

5. The method of claim 4, wherein the sort control card comprises a parameter list.

6. The method of claim 4, wherein the sort control card identifies a starting position for each key field in a record relative to a first key field of the record.

7. The method of claim 4, wherein the sort control card further indicates a data type for each key field in a record.

8. The method of claim 7, wherein the sort control card further indicates a sort order for each key field in a record.

9. The method of claim 1, wherein the act of expanding comprises adjusting each key field to a fixed length.

10. The method of claim 1, wherein the act of storing the expanded key information in a key record further comprises, associating a value with each key record that identifies the data record from which the expanded key information was extracted.

11. The method of claim 10, wherein the act of storing the expanded key information in a key record does not comprise storing a data field from the data record associated with the key record.

12. The method of claim 1, wherein the working storage comprises one or more direct access storage devices.

13. The method of claim 1, further comprising repeating the acts of obtaining, sorting, reorganizing and storing for at least a second plurality of data records.

14. The method of claim 13, further comprising merging the two or more plurality of reorganized data records.

15. The method of claim 14, wherein the act of obtaining a plurality of data records comprises obtaining a plurality of DB2 data records and the act of merging further comprises reloading the merged plurality of reorganized data records into the DB2 data object.

16. A method for sorting an object, the object having a plurality of records, each record having a plurality of key fields at least one of which is a variable length key field, the method comprising:
retrieving a plurality of records of an object;
extracting each key field in a record into a fixed length component of a corresponding key record, wherein the key record is not stored in intermediate storage;
sorting the plurality of key records based on the extracted fixed length components;
reordering the plurality of records based on the sorted plurality of key records; and
storing the reordered plurality of records in an intermediate storage, wherein the act of storing does not include storing fixed length components of a key record.

17. The method of claim 16, wherein the act of retrieving comprises retrieving data records from one or more storage devices.

18. The method of claim 16, wherein the act of extracting comprises using a sort control card to determine the starting locations of each of the plurality of key fields.

19. The method of claim 18, wherein the sort control card comprises a parameter list.

20. The method of claim 18, wherein the sort control card further indicates a data type for each key field in a record.

21. The method of claim 20, wherein the sort control card further indicates a sort order for each key field in a record.

22. The method of claim 16, wherein the act of extracting each key field in a record into a fixed length component comprises expanding each key field to a maximum length.

23. The method of claim 16, wherein the act of extracting further comprises associating a value with each key record that identifies the data record from which the key was extracted.

24. The method of claim 23, wherein the act of extracting each key field in a record into a fixed length component of a corresponding key record does not comprise storing data fields associated with the data record in the key record.

25. The method of claim 16, further comprising repeating the acts of retrieving, extracting, sorting, reordering and storing for at least a second plurality of records.

26. The method of claim 25, further comprising merging the two or more plurality of reordered records.

27. A program storage device, readable by a programmable control device, comprising instructions stored on the program storage device for causing the programmable control device to:
obtain a plurality of data records from a data object and, for each data record (1) extract key information, (2) expand the extracted key information, and (3) store the expanded key information in a key record, wherein the expanded key information is not stored in intermediate storage;
sort the plurality of key records based on the expanded key information;
reorganize the plurality of data records to correspond to the order of the sorted plurality of key records; and
store the reorganized plurality of data records without their associated expanded key information to a working storage.

28. The program storage device of claim 27, wherein the instructions to obtain comprise instructions to obtain data records from one or more storage devices.

29. The program storage device of claim 27, wherein the instructions to extract comprise instructions to:
determine a starting location for a first key field; and
calculate the starting location of a subsequent key field based on the determined starting location of the first key field.

30. The program storage device of claim 29, wherein the instructions to determine comprise instructions to obtain the starting location of the first key field from a sort control card.

31. The program storage device of claim 30, wherein the sort control card comprises a parameter list.

32. The program storage device of claim 30, wherein the sort control card identifies a starting position for each key field in a record relative to a first key field of the record.

33. The program storage device of claim 30, wherein the sort control card further indicates a data type for each key field in a record.

34. The program storage device of claim 33, wherein the sort control card further indicates a sort order for each key field in a record.

35. The program storage device of claim 27, wherein the instructions to expand comprise instructions to adjust each key field to a fixed length.

36. The program storage device of claim 27, wherein the instructions to store the expanded key information in a key record further comprise instructions to associate a value with each key record that identifies the data record from which the expanded key information was extracted.

37. The program storage device of claim 36, wherein the instructions to store the expanded key information in a key record do not comprise instructions to store a data field of the data record associated with the key record.

38. The program storage device of claim 27, wherein the instructions to obtain, sort, reorganize and store are performed for at least a second plurality of data records.

39. The program storage device of claim 38, further comprising instructions to merge the two or more plurality of reorganized data records.

40. A sorting system comprising:
   memory means for storing a data object and instructions; and
   processing means, communicatively coupled to the memory means, for executing the instructions to cause the processing means to—
      obtain a plurality of data records from the data object and, for each data record (1) extract key information, (2) expand the extracted key information, and (3) store the expanded key information in a key record, wherein the expanded key information is not stored in intermediate storage
      sort the plurality of key records based on the expanded key information,
      reorganize the plurality of data records to correspond to the order of the sorted plurality of key records, and
      store the reorganized plurality of data records without their associated expanded key information to a working storage.

41. The sorting system of claim 40, wherein the memory means comprises two or more storage devices coupled by a communications network.

42. The sorting system of claim 41, wherein the data object comprises a first plurality of records stored on a first storage device and a second plurality of records stored on a second storage device.

43. The sorting system of claim 40, wherein the processing means comprises two or more communicatively coupled computer processors.

44. The sorting system of claim 40, wherein the instructions to extract comprise instructions to:
   determine a starting location for a first key field; and
   calculate the starting location of a subsequent key field based on the determined starting location of the first key field.

45. The sorting system of claim 44, wherein the instructions to determine comprise instructions to obtain the starting location of the first key field from a sort control card.

46. The sorting system of claim 45, wherein the sort control card comprises a parameter list.

47. The sorting system of claim 45, wherein the sort control card identifies a starting position for each key field in a record relative to a first key field of the record.

48. The sorting system of claim 45, wherein the sort control card further indicates a data type for each key field in a record.

49. The sorting system of claim 48, wherein the sort control card further indicates a sort order for each key field in a record.

50. The sorting system of claim 40, wherein the instructions to expand comprise instructions to adjust each key field to a fixed length.

51. The sorting system of claim 40, wherein the instructions to store the expanded key information in a key record further comprise instructions to associate a value with each key record that identifies the data record from which the expanded key information was extracted.

52. The sorting system of claim 51, wherein the instructions to store the expanded key information in a key record does not comprise instructions to store data fields associated with the data record in the key record.

53. The sorting system of claim 40, wherein the instructions to obtain, sort, reorganize and store are performed for at least a second plurality of data records.

54. The sorting system of claim 53, further comprising instructions to merge the two or more plurality of reorganized data records.

55. A data sort method, comprising:
   obtaining a plurality of data records from a database object, for each of the plurality of data records—
      extracting key information,
      expanding the extracted key information, and
      storing the expanded key information in a key record, wherein the expanded key information is not stored in intermediate storage;
   sorting the plurality of key records based on the expanded key information;
   reorganizing the plurality of data records to correspond to the order of the sorted plurality of key records;
   storing the reorganized plurality of data records without their associated expanded key information in a working storage;
   repeating the acts of obtaining, sorting, reorganizing and storing for at least a second plurality of data records;
   merging the at least two plurality of reorganized data records; and
   re-loading the merged plurality of reorganized data records into the database object.

56. The data sort method of claim 55, wherein the act of extracting comprises obtaining the starting location of a first key field in a data record from a sort control card.

57. The data sort method of claim 56, wherein the sort control card identifies a starting position for each key field in a record relative to a first key field of the record.

58. The data sort method of claim 56, wherein the sort control card further indicates a data type for each key field in a record.

59. The data sort method of claim 58, wherein the sort control card further indicates a sort order for each key field in a record.

60. The data sort method of claim 58, wherein the sort control card comprises a parameter list.

61. The data sort method of claim 55, wherein the act of expanding comprises adjusting each key field to a fixed length.

62. The data sort method of claim 55, wherein the act of storing the expanded key information in a key record further comprises, associating a value with each key record that identifies the data record from which the expanded key information was extracted.

63. The data sort method of claim 62, wherein the act of storing the expanded key information in a key record does not comprise storing a data field from the data record associated with the key record.

* * * * *

UNITED STATES PATENT AND TRADEMARK OFFICE
CERTIFICATE OF CORRECTION

PATENT NO. : 7,496,572 B2  Page 1 of 1
APPLICATION NO. : 10/618500
DATED : February 24, 2009
INVENTOR(S) : Christopher Y. Blaicher It is certified that error appears in the above-identified patent and that said Letters Patent is hereby corrected as shown below:

In column 7 line 9 (the fourth clause in independent claim 1), remove "the". The claim should read:
  A data sort method, comprising:

obtaining a plurality of data records and, for each data record extracting key information, expanding the extracted key information, and storing the expanded key information in a key record, wherein the expanded key information is not stored in intermediate storage;

sorting the plurality of key records based on the expanded key information;

reorganizing the plurality of data records to correspond to the order of the sorted plurality of key records; and storing the reorganized plurality of data records without their associated expanded key information to a working storage.

Signed and Sealed this

Twenty-first Day of April, 2009

JOHN DOLL
*Acting Director of the United States Patent and Trademark Office*